(12) United States Patent
Gofman et al.

(10) Patent No.: US 7,210,632 B2
(45) Date of Patent: May 1, 2007

(54) ON-AXIS CONTROL OVER SCANNING BEAM SPOT SIZE AND SHAPE IN ELECTRO-OPTICAL READERS

(75) Inventors: Yuri Gofman, Bohemia, NY (US); Vladimir Gurevich, Stony Brook, NY (US); Mark Krichever, Hauppague, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 239 days.

(21) Appl. No.: 10/452,352

(22) Filed: Jun. 2, 2003

(65) Prior Publication Data

US 2004/0238638 A1     Dec. 2, 2004

(51) Int. Cl.
*G06K 7/10*     (2006.01)
*G06K 9/24*     (2006.01)

(52) U.S. Cl. ............................. 235/462.2; 235/462.21; 235/462.22; 235/462.23

(58) Field of Classification Search ........... 235/462.01, 235/462.2, 462.21, 462.22, 462.23, 462.32, 235/462.35, 454, 462.24; 359/17, 19, 198; 369/44.11, 44.23; 250/271
See application file for complete search history.

(56) References Cited

U.S. PATENT DOCUMENTS

| | | | | | |
|---|---|---|---|---|---|
| 4,808,804 | A | * | 2/1989 | Krichever et al. | 235/462.22 |
| 5,010,534 | A | * | 4/1991 | Enari et al. | 369/30.16 |
| 5,064,258 | A | * | 11/1991 | Inokuchi et al. | 359/17 |
| 5,283,699 | A | * | 2/1994 | Komai et al. | 235/462.42 |
| 5,304,788 | A | * | 4/1994 | Metlitsky et al. | 235/462.21 |
| 5,811,774 | A | * | 9/1998 | Ju et al. | 235/455 |
| 5,905,702 | A | * | 5/1999 | Inoue | 369/44.29 |
| 6,154,260 | A | * | 11/2000 | Matsuda et al. | 349/1 |
| 6,454,167 | B1 | * | 9/2002 | Barkan et al. | 235/462.01 |
| 6,651,886 | B2 | * | 11/2003 | Gurevich et al. | 235/454 |

* cited by examiner

*Primary Examiner*—Michael G. Lee
*Assistant Examiner*—Kumiko C. Koyama
(74) *Attorney, Agent, or Firm*—Kirschstein, et al.

(57) ABSTRACT

A cylindrical lens is axially moved along an optical axis to control a shape and size of a laser beam spot that is scanned across a symbol to be read by an electro-optical reader.

11 Claims, 2 Drawing Sheets

ON-AXIS CONTROL OVER SCANNING BEAM SPOT SIZE AND SHAPE IN ELECTRO-OPTICAL READERS

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, controlling a size and shape of a laser beam spot that scans a symbol during symbol reading.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. Nos. 4,251,798; No. 4,369,361; No. 4,387,297; No. 4,409,470, No. 4,760,248 and No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a predetermined target location. Preferably, the cross-section of the beam spot at the target location approximates the minimum width between symbol regions of different light reflectivity, i.e., the bars and spaces.

In conventional readers, the light beam is directed by a scanning component along a light path toward a target symbol. The reader operates by repetitively scanning the light beam in a scan pattern, for example, a line or a series of lines across the target symbol by movement of the scanning component such as a mirror disposed in the path of the light beam. The scanning component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected and converted into an analog electrical signal. A digitizer digitizes the analog signal. The digitized signal from the digitizer is then decoded, based upon the specific symbology used for the symbol, into a binary data representation of the data encoded in the symbol. The binary data may then be subsequently decoded into the alphanumeric characters represented by the symbol.

Overall performance of the reader for reading symbols is a function of the optical components which direct the light beam at the target symbol and which resolve the reflected light, and a function of the electronic components which convert and process the information contained in the reflected light. A measure of the overall performance of the reader is its ability to resolve the narrowest elements of the symbol and its ability to decode symbols located both close in and far away from the reader.

The scan pattern that scans the symbol can take a variety of forms, such as repeated line scan, standard raster scan, jittered raster scan, fishbone, petal, etc. These beam patterns are generated by controlled motions of one or more scan components in the beam path. Typically, the scan component includes a mirror that is driven by some form of scanning motor to periodically deflect the beam through the desired beam scanning pattern. For a repeated line scan beam pattern, a polygonal mirror unidirectionally rotated by a simple motor can be utilized. For more complex beam patterns, more involved drive mechanisms are required.

The frequency at which the beam pattern is executed is also an important consideration. The more times a symbol can be scanned in a given time period, the chances of obtaining a valid read of the symbol are increased. This is particularly important when the symbols are borne by moving objects, such as packages traveling on a conveyor belt.

Many applications call for a hand-held reader where a user aims the light beam at the symbol, and the beam executes a scan pattern to read the symbol. For such applications, the arrangement of electro-optical components must be compact in order to be accommodated in a hand-held package which may be pistol-shaped. Moreover, such readers must be lightweight and structurally robust to withstand physical shock resulting from rough handling. It is also desirable that minimal power be consumed during operation to promote battery usage.

For reading a one-dimensional symbol, or for reading a poorly printed symbol, or a symbol printed with a low contrast against its background, it is desirable to form the beam spot with an elliptical or ovoidal cross-section with the smaller dimension of the spot extending lengthwise along the symbol along the scan direction. For reading a two-dimensional symbol, it is desirable to form the beam spot with a circular cross-section. Using a compromise beam spot to accommodate these conflicting requirements on the shape of the beam spot has historically yielded poor results.

It is known to switch between different beam spots by moving a focusing lens radially into and out of the optical path of the laser beam. However, this radial movement only achieves dual focusing, that is, focusing at only two positions, and a large movement is required to move the focusing lens. This large movement increases the size of the arrangement and, in turn, the reader, thereby preventing its ready adoption in lightweight, portable applications.

It is also known to change the shape of the beam spot by changing the optical power of stationary liquid crystal lenses or electro-static mirrors. However, these approaches require relatively high voltages and consume a relatively high amount of power, again making them less than ideal for lightweight, portable applications.

SUMMARY OF THE INVENTION

Objects of the Invention

One object of this invention is to provide an improved arrangement for and method of controlling a size and shape of a scanning beam spot for utilization in a reader for reading a data-encoded symbol.

Another object of this invention is to provide an arrangement which is compact, lightweight, durable and efficient in construction and operation, and thus is ideally suited for portable hand-held applications.

Features of the Invention

In keeping with these objects and others which will become apparent hereinafter, one feature of this invention resides, briefly stated, in an arrangement for, and a method of, controlling scanning beam spot size and shape in a reader for electro-optically reading indicia, such as one- and/or two-dimensional bar code symbols.

The invention provides a laser, preferably a laser diode, for emitting a laser beam along an optical axis, and an optical modifier for optically modifying the beam exiting the laser diode to have an ovoidal cross-section in a plane perpendicular to the optical axis. Preferably, the optical modifier is a focusing lens having astigmatism, but could also be a focusing lens in combination with a cylindrical lens or mirror.

In accordance with this invention, a movable controller, preferably a cylindrical lens, is operative for optically conditioning the beam exiting the modifier to form a beam spot on the symbol. The controller is axially movable along the optical axis between one position in which the beam spot has a generally circular cross-section, and another position in which the beam spot has a generally ovoidal cross-section. A drive is operative for moving the controller between said positions, as well as to any intermediate position between said positions.

A scanner is operative for sweeping the beam spot across the symbol with the controller in one of the positions. For example, when the controller is in said one position, the beam spot is generally circular and is better suited for reading two-dimensional symbols, but could be used for reading one-dimensional symbols. When the controller is in said other position, the beam spot is generally ovoidal and is better suited for reading one-dimensional symbols, or for reading poorly printed or low contrast symbols, but could be used for reading two-dimensional symbols. Intermediate these two positions, the beam spot is proportionally shaped and sized to control visibility of the beam spot.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
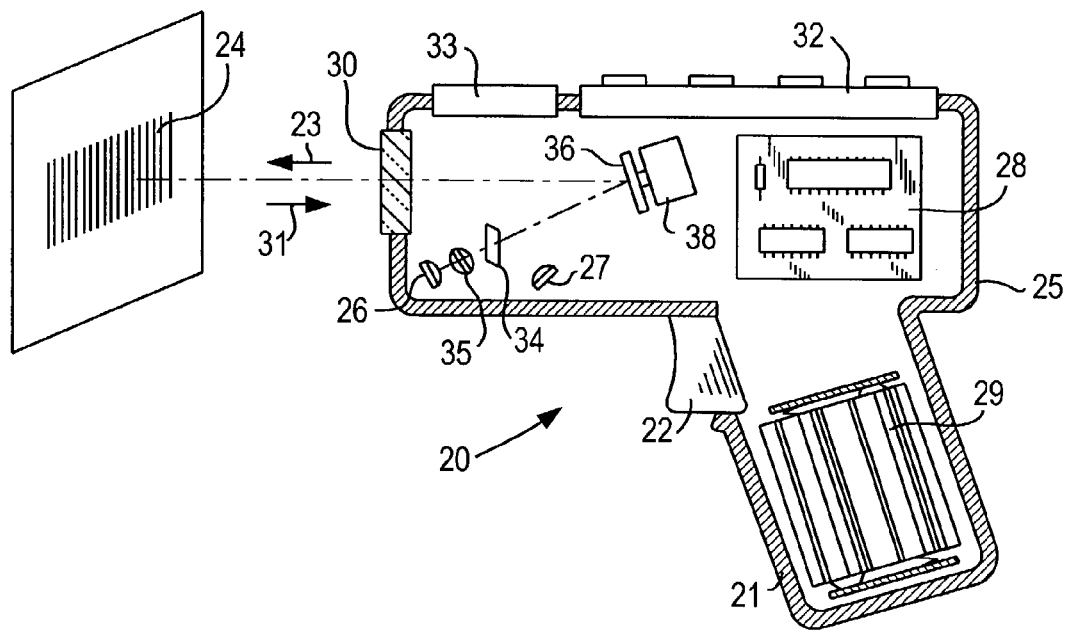
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by optics 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

Figure 2:
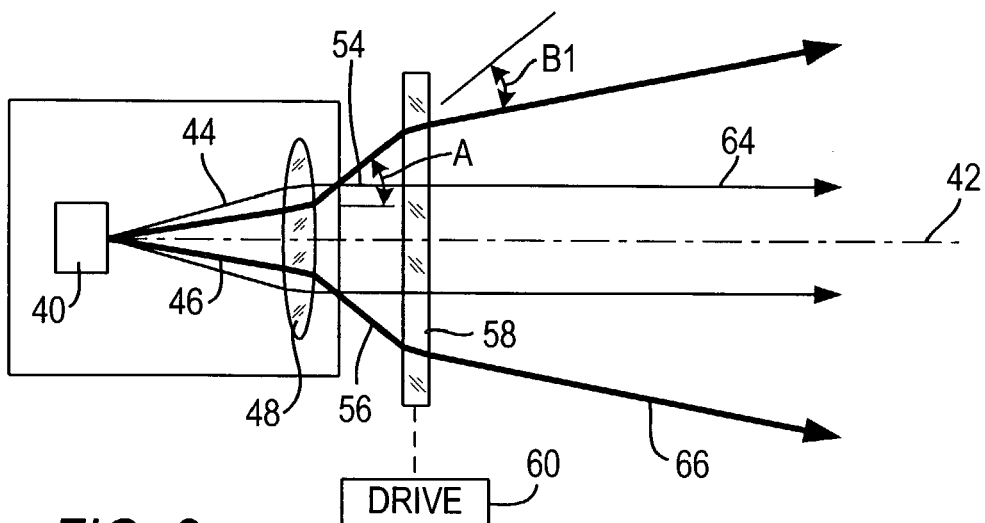
FIG. 2 is a schematic diagram of an arrangement in one operative position in accordance with this invention for use in the reader of FIG. 1.
Figure 3:
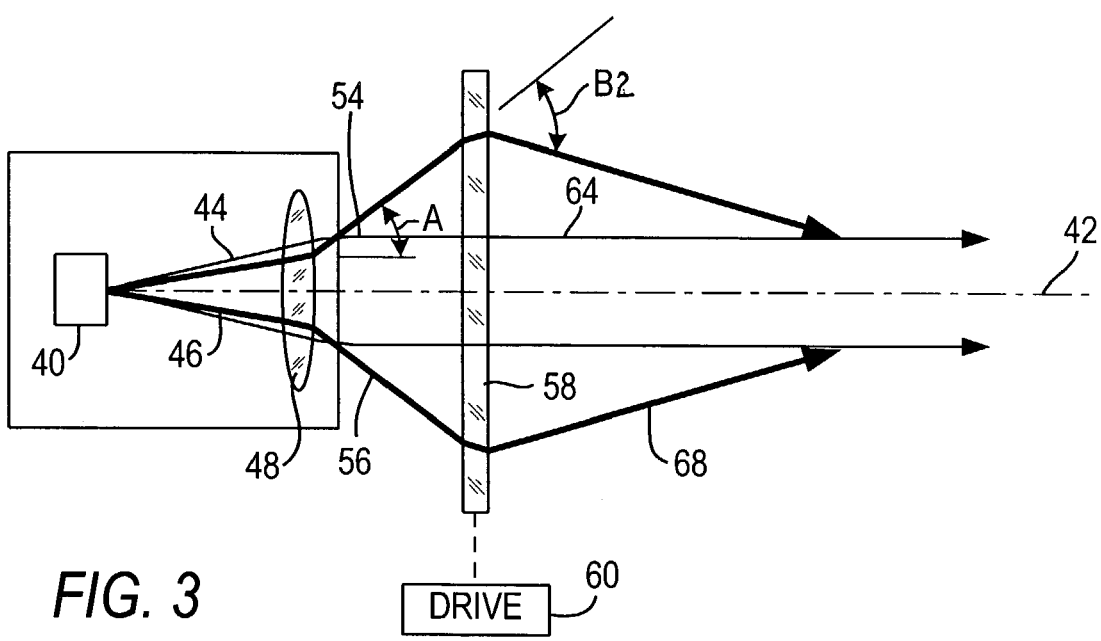
FIG. 3 is analogous to FIG. 2 but of the arrangement in another operative position.

In accordance with this invention, the optics 35 in the path of the light beam between the light source 26 and the scan mirror 36 is configured as shown in FIGS. 2-3 to control the size and shape of the beam spot on the symbol. Reference numeral 40 identifies a solid-state laser source, such as a laser diode, for emitting a diverging laser beam along an optical axis 42. The laser beam has an ovoidal cross-section having a horizontal dimension 44 extending along the scan direction and a vertical dimension 46 extending perpendicularly of the scan direction. An optical modifier, preferably a focusing lens 48 having astigmatism, optically modifies the laser beam exiting the diode 40 differently in different directions. Thus, the focusing lens 48 focuses the beam along the scan direction to be a collimated beam having a horizontal dimension 54 to provide optimum focusing ranges, and diverges the beam at an angle A along the vertical direction to be a diverging beam having a vertical dimension 56. After exiting the focusing lens 48, the beam has an ovoidal cross-section in a plane perpendicular to the optical axis. The vertical dimension 56 of the beam exiting the lens 48 is greater than the vertical dimension 46 of the beam entering the lens 48.

An optical conditioner, preferably a cylindrical lens 48, is positioned in the optical path and has optical power only in the vertical direction. In the preferred embodiment, the cylindrical lens 58 does not change the horizontal beam divergence so that the collimated beam incident thereon passes through unchanged, but the diverging beam is refracted. More specifically, the horizontal dimension 54 of the beam passes through the cylindrical lens with a horizontal dimension 64 which corresponds to the horizontal dimension 54. However, the vertical dimension 56 of the beam is refracted at different angles (B1, B2) and has different vertical dimensions 66, 68 in dependence upon the position of cylindrical lens 58. The cylindrical lens is movable along the optical axis 42 between a first position shown in FIG. 2 and a second position shown in FIG. 3 by a drive 60.

The vertical divergence of the beam exiting the cylindrical lens 58 changes as a function of the axial displacement of the cylindrical lens 58, while the horizontal divergence of the beam does not change. The difference in the vertical beam divergence angles (B2−B1) is linearly proportional to the axial shift (x) of the cylindrical lens and can be mathematically expressed as:

$$B2-B1=(x \cdot A)/F$$

where F is the focal length of the cylindrical lens 58, and A is the vertical beam divergence before the cylindrical lens.

The position of the cylindrical lens 58 is adaptively changed either before or during operation of the reader. For example, if the signal processing circuitry 28 recognizes from the decoded data that the symbol being decoded is a two-dimensional symbol, then the signal processing circuitry 28 controls the drive 60 to move the lens 58 to the position of FIG. 3 where the cross-section of the beam spot more closely resembles a circle. If the signal processing circuitry 28 recognizes that the symbol being decoded is a one-dimensional symbol, or is poorly printed, or has a low contrast, then the signal processing circuitry 28 controls the drive 60 to move the lens 58 to the position of FIG. 2 where the cross-section of the beam spot is elliptical. If the signal processing circuitry 28 recognizes that the symbol being decoded is tilted, then the signal processing circuitry 28 controls the drive 60 to move the lens 58 to a position where the size and shape and orientation of the beam spot is optimized for reading the tilted symbol. Rather than relying on the signal processing circuitry, the lens 58 can be also manually moved by the operator.

The lens 58 is not only movable to the end positions of FIGS. 2 and 3, but is also continuously movable to any intermediate position therebetween. In this way, the size and shape of the beam spot, as well as its visibility at different distances from the reader can be finely controlled in an analog manner.

This invention also contemplates providing some beam divergence in front of the cylindrical lens 58 and imparting some optical power to the cylindrical lens 58 in the horizontal direction in order to adaptively control the size and shape of the beam in the horizontal direction as well.

The drive 60 can be achieved with a motor, for example, by periodically energizing an electromagnetic coil placed near a permanent magnet operatively connected to the lens 58. The interacting magnetic fields between the magnet and the coil are used to axially shift the lens 58.

It will be understood that each of the elements described above, or two or more together, also may find a useful application in other types of constructions differing from the types described above.

While the invention has been illustrated and described as embodied in an on-axis control over scanning beam spot size and shape in electro-optical readers, it is not intended to be limited to the details shown, since various modifications and structural changes may be made without departing in any way from the spirit of the present invention. For example, the focusing lens 48 with astigmatism can be replaced by a convex lens and a cylindrical lens. Instead of using lenses 48, 58, other optical components such as moving phase modifiers or apertures could be used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for controlling scanning bean spot size and shape in a reader for electro-optically reading indicia, the arrangement comprising:
    a) a laser for emitting a laser beam along an optical axis;
    b) an optical modifier for optically modifying the beam exiting the laser to have an ovoidal cross-section in a plane perpendicular to the optical axis, wherein the modifier is a focusing modifier lens to the collimating the beam along a scan direction along which the indicia is read, and for diverging the beam along a scan direction along a transverse direction along perpendicular to the scan direction;
    c) a movable controller for optically conditioning the beam exiting the modifier to form a beam spot on the indicia, the controller being axially movable along the optical axis between one position in which the beam spot has a generally circular cross-section, and another position in which the beam spot has a generally ovoidal cross-section; and
    d) a scanner for sweeping the beam spot across the indicia with the controller in one of said positions.

2. The arrangement of claim 1, wherein the laser is a solid-state laser.

3. The arrangement of claim 1, wherein the controller is a controller lens having optical power only in the transverse direction.

4. The arrangement of claim 3, wherein the controller lens is a cylindrical lens.

5. The arrangement of claim 1, and a drive for linearly moving the controller between said positions and to any intermediate position between said positions.

6. The arrangement of claim 1, wherein the indicia is a one-dimensional, machine-readable symbol, and wherein the scanner is operative for sweeping the beam spot across the symbol with the controller in said other position.

7. The arrangement of claim 1, wherein the indicia is two-dimensional, machine-readable symbol, and wherein the scanner is operative for sweeping the beam spot across the symbol with the controller in said one position.

8. An arrangement for controlling scanning beam spot size and shape in a reader for electro-optically reading machine-readable symbols, the arrangement comprising:
   a) a laser diode for emitting a laser beam along an optical axis;
   b) an optical modifier focusing lens having astigmatism for optically modifying the beam exiting the laser diode to have an ovoidal cross-section in a plane perpendicular to the optical axis;
   c) a movable controller lens for optically conditioning the beam exiting the modifier lens to form a beam spot on a symbol to be read, the controller lens being axially movable along the optical axis between one position in which the beam spot has a generally circular cross-section, and another position in which the beam spot has a generally ovoidal cross-section;
   d) a drive for moving the controller lens between said positions; and
   e) a scanner for sweeping the beam spot in mutually orthogonal directions across the symbol with the controller lens in said one position, and for sweeping the beam spot in a scan direction lengthwise across the symbol with the controller lens in said other position.

9. The arrangement of claim 8, wherein the controller lens is a cylindrical lens having optical power only in transverse direction perpendicular to the scan direction.

10. The arrangement of claim 8, wherein the drive is operative for linearly moving the controller lens to any intermediate position between said positions.

11. A method of controlling scanning beam spot size and shape in a reader for electro-optically reading machine-readable symbols, the method comprising the steps of:
   a) emitting a laser beam along an optical axis;
   b) optically modifying the beam, using a focusing lens having astigmatism, to have an ovoidal cross-section in a plane perpendicular to the optical axis;
   c) optically conditioning the beam to form a beam spot on a symbol to be read, by axially moving a controller lens along the optical axis between one position in which the beam spot has a generally circular cross-section, and another position in which the beam spot has a generally ovoidal cross-section;
   d) moving the controller lens between said positions; and
   e) sweeping the beam spot in mutually orthogonal directions across the symbol with the controller lens in said one position, and sweeping the beam spot in a scan direction lengthwise across the symbol with the controller lens in said other position.

* * * * *